(12) United States Patent
Welter et al.

(10) Patent No.: US 10,549,608 B2
(45) Date of Patent: Feb. 4, 2020

(54) VANITY MIRROR ASSEMBLY FOR A VEHICLE SUN VISOR

(71) Applicant: Daimay North America Automotive Engineering Technology, Inc., Holland, MI (US)

(72) Inventors: Patrick Welter, Lachambre (FR); Frederic Selvini, Vasberg (FR); Guillaume Duthoit, Bambiderstoff (FR)

(73) Assignee: Daimay North Amercia Automotive Engineering Technology, Inc., Holland, MI (US)

( * ) Notice: Subject to any disclaimer, the term of this patent is extended or adjusted under 35 U.S.C. 154(b) by 0 days.

(21) Appl. No.: 16/537,066

(22) Filed: Aug. 9, 2019

(65) Prior Publication Data
US 2019/0359038 A1 Nov. 28, 2019

Related U.S. Application Data

(62) Division of application No. 15/492,734, filed on Apr. 20, 2017, now Pat. No. 10,377,213.

(51) Int. Cl.
*B60J 3/02* (2006.01)
*B60R 1/04* (2006.01)
*B60R 1/12* (2006.01)

(52) U.S. Cl.
CPC ........... *B60J 3/0282* (2013.01); *B60J 3/0278* (2013.01); *B60R 1/04* (2013.01); *B60R 1/12* (2013.01); *B60J 3/0204* (2013.01)

(58) Field of Classification Search
CPC ......... B60J 3/0278; B60J 3/0282; B60R 1/04; B60R 2001/1238; B60R 2001/1269; G02B 7/182

USPC .............. 359/844, 871; 296/97.2, 97.5, 1.11
See application file for complete search history.

(56) References Cited

U.S. PATENT DOCUMENTS

| | | | |
|---|---|---|---|
| 4,521,051 A | 6/1985 | Cody et al. |
| 4,648,011 A | 3/1987 | Boote et al. |
| 4,653,798 A | 3/1987 | White et al. |
| 4,922,391 A | 5/1990 | Dykstra |
| 4,961,608 A | 10/1990 | Nash |
| 5,054,839 A | 10/1991 | White et al. |

(Continued)

FOREIGN PATENT DOCUMENTS

| | | |
|---|---|---|
| EP | 0331779 A1 | 9/1989 |
| WO | 2009079568 A2 | 6/2009 |
| WO | 2014012671 A2 | 1/2014 |

OTHER PUBLICATIONS

Partial European Search Report for EP Application No. 18157056.5 dated Oct. 10, 2018, 12 pgs.

*Primary Examiner* — Ricky D Shafer
(74) *Attorney, Agent, or Firm* — Fletcher Yoder, P.C.

(57) ABSTRACT

A vanity mirror assembly for a vehicle sun visor includes a cover assembly configured to be slideably supported within a frame and to cover a reflective element while in a closed position and to at least partially expose the reflective element to a vehicle interior while in an open position. The cover assembly includes a substantially rigid body portion, one or more flexible arms extending from the substantially rigid body, and a biasing member configured to drive the one or more flexible arms away from the substantially rigid body and into a corresponding groove of the frame.

20 Claims, 11 Drawing Sheets

(56) References Cited

U.S. PATENT DOCUMENTS

| | | |
|---|---|---|
| 5,205,639 A | 4/1993 | White et al. |
| 5,441,325 A | 8/1995 | Toth et al. |
| 7,909,383 B2* | 3/2011 | Dolisy .................. B60J 3/0282 296/97.1 |
| 10,377,213 B2* | 8/2019 | Welter |
| 2006/0113819 A1 | 6/2006 | Remy |

* cited by examiner

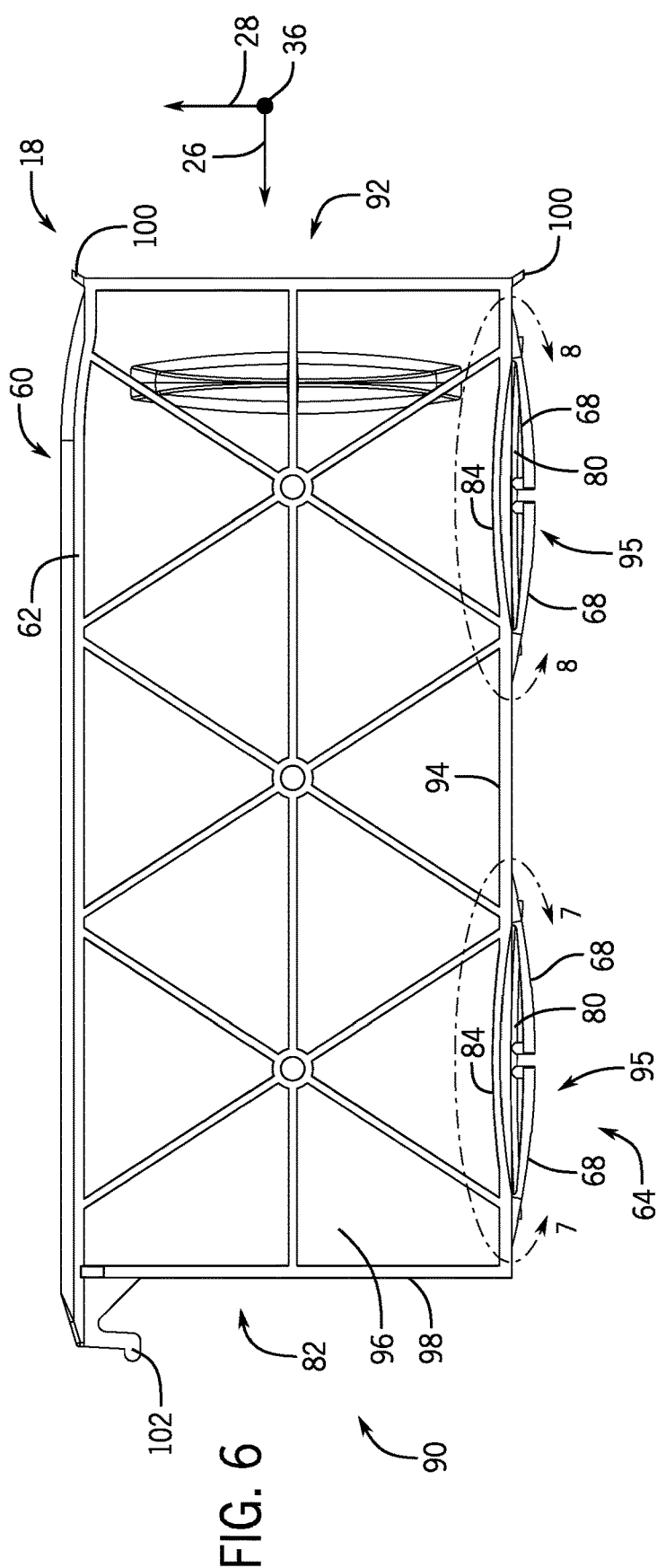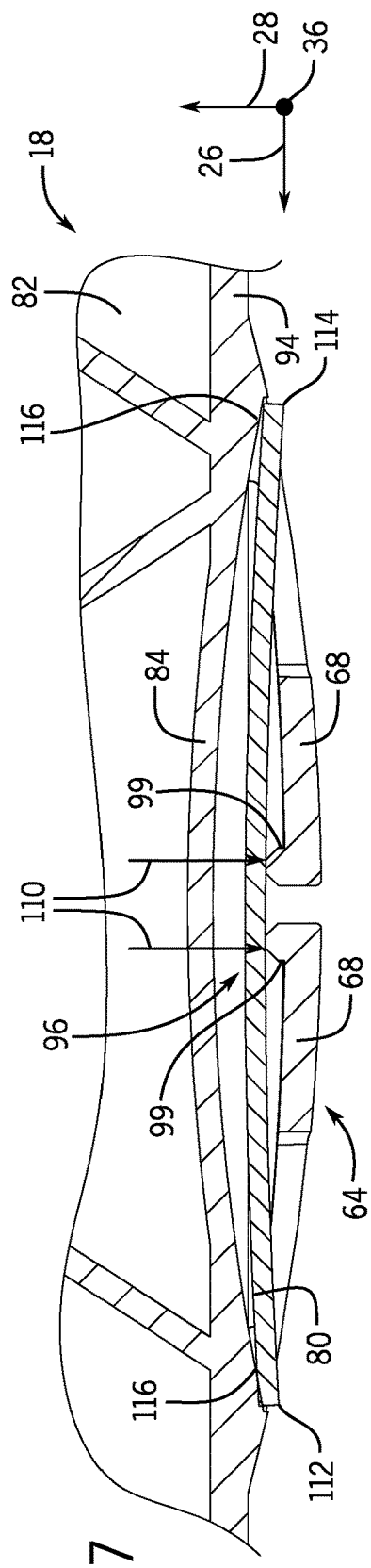

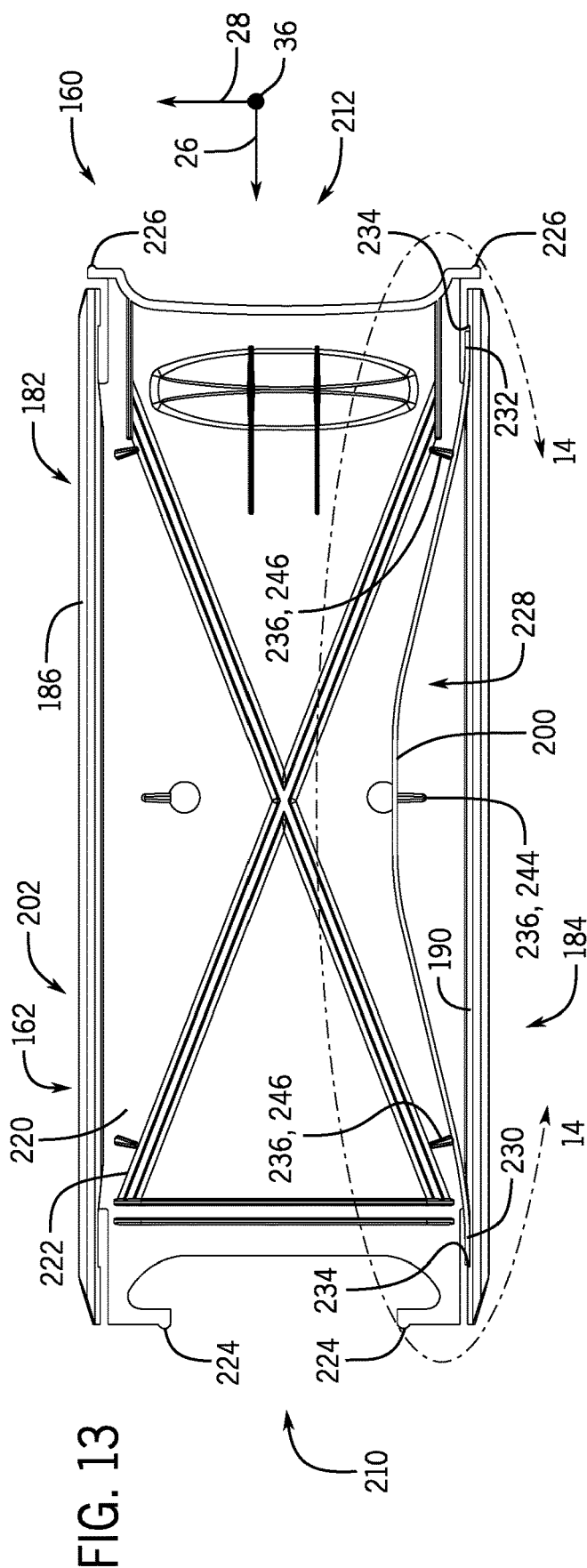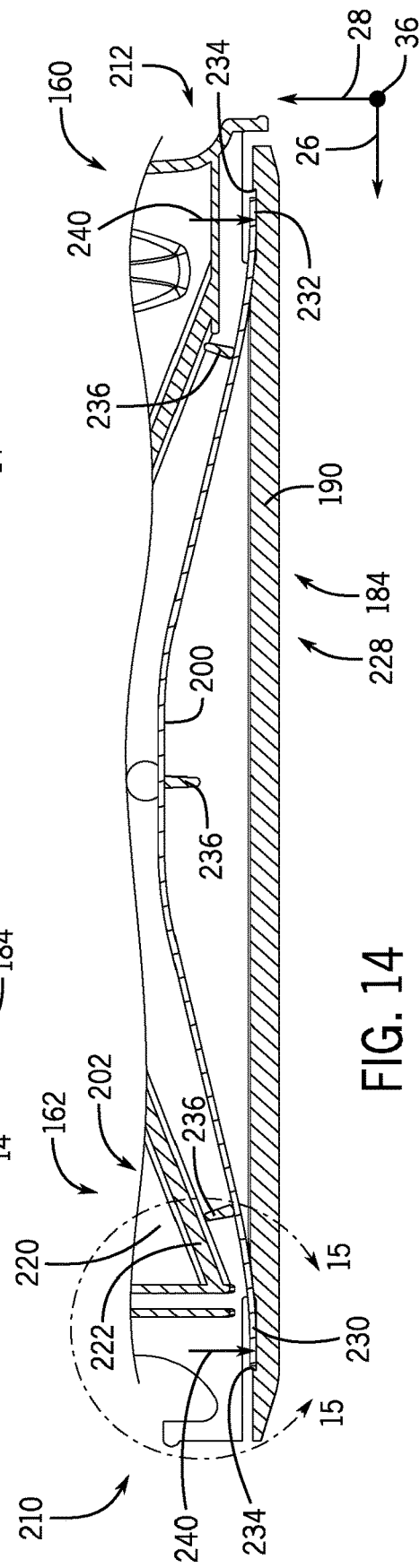

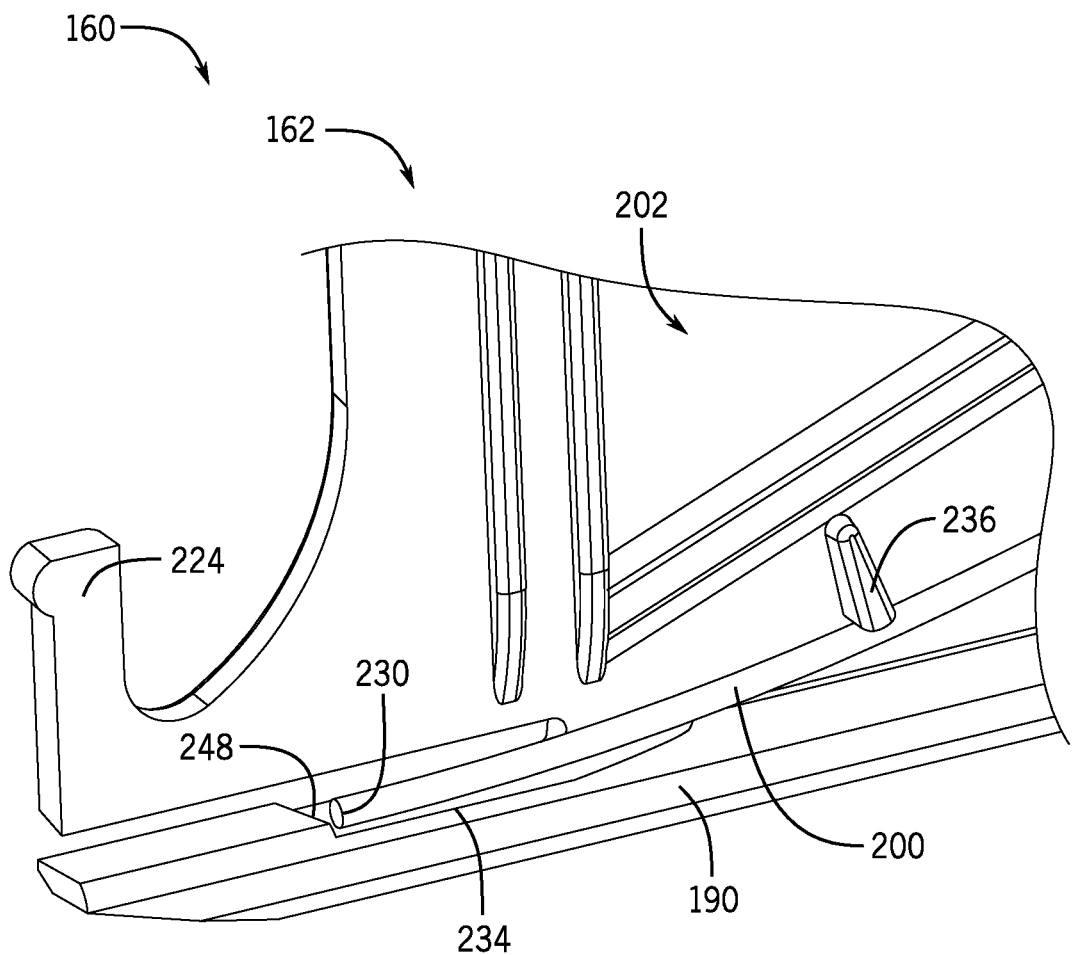
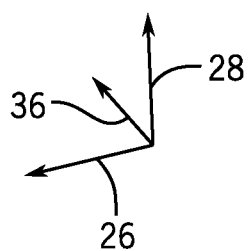
FIG. 15

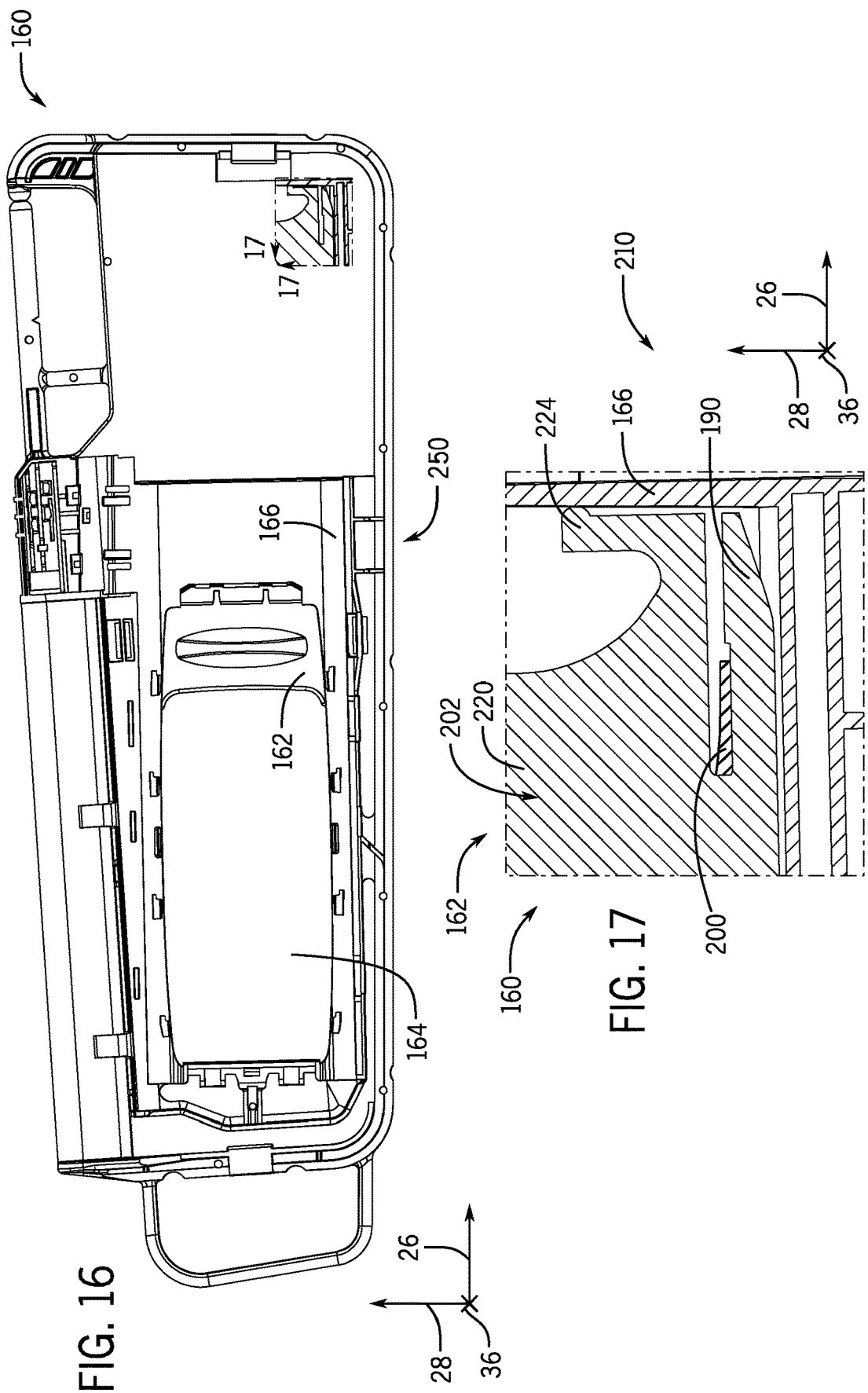

VANITY MIRROR ASSEMBLY FOR A VEHICLE SUN VISOR

CROSS REFERENCE TO RELATED APPLICATION

This application is a divisional of U.S. patent application Ser. No. 15/492,734, entitled "VANITY MIRROR ASSEMBLY FOR A VEHICLE SUN VISOR", filed Apr. 20, 2017, now U.S. Pat. No. 10,377,213, which is herein incorporated by reference in its entirety.

BACKGROUND

The disclosure relates generally to a vanity mirror assembly for a vehicle sun visor.

Many vehicles employ sun visors to shield occupants from sunlight, thereby enabling the occupants to focus on the surrounding environment. For example, certain vehicles include sun visors positioned adjacent to a top portion of the windshield to facilitate access by a driver and/or front passenger. Under certain lighting conditions, a driver may deploy the sun visor to reduce light transmission into the vehicle interior, thereby enabling the driver to focus on vehicle operations. Certain sun visors include a vanity mirror configured to enable a vehicle occupant to view a reflection in the vanity mirror, and the vanity mirror may be covered by a cover when not in use.

BRIEF DESCRIPTION

The present disclosure relates to a vanity mirror assembly for a vehicle sun visor including a cover assembly configured to be slideably supported within a frame and to cover a reflective element while in a closed position and to at least partially expose the reflective element to a vehicle interior while in an open position. The cover assembly includes a substantially rigid body portion, one or more flexible arms extending from the substantially rigid body, and a biasing member configured to drive the one or more flexible arms away from the substantially rigid body and into a corresponding groove of the frame.

The present disclosure also relates to a vanity mirror assembly for a vehicle sun visor including a frame having a first groove and a cover configured to slide relative to the frame between a closed position in which the cover is disposed in front of a reflective element and an open position in which the cover at least partially exposes the reflective element to a vehicle interior. The first groove is configured to receive a first edge portion of the cover, the first groove includes tapered surfaces that converge toward one another, and the first edge portion includes a curved contacting surface that is configured to contact the tapered surfaces as the cover slides within the frame between the closed position and the open position.

The present disclosure further relates to a vanity mirror assembly for a vehicle sun visor including a frame, a cover configured to slide relative to the frame between a closed position in which the cover is disposed in front of a reflective element and an open position in which the cover at least partially exposes the reflective element to a vehicle interior, and a biasing member configured to drive a flexible portion of the cover away from a substantially rigid body portion of the cover and into a corresponding groove of the frame. The biasing member is configured to move with the cover and to avoid contact with the frame as the cover slides relative to the frame between the closed position and the open position.

DRAWINGS

FIG. 6 is a rear view of the cover of the vanity mirror assembly of FIG. 3.

FIG. 7 is a cross-sectional rear view of a portion of the cover of the vanity mirror assembly taken within line 7-7 of FIG. 6.

FIG. 13 is a rear view of the cover of the vanity mirror assembly of FIG. 11.

FIG. 14 is a cross-sectional rear view of a portion of the cover of the vanity mirror assembly taken within line 14-14 of FIG. 13.

FIG. 15 is a perspective rear view of a portion of the cover of the vanity mirror assembly taken within line 15-15 of FIG. 14.

FIG. 16 is a front view of the vanity mirror assembly of FIG. 11, in which the cover of the vanity mirror assembly is in an open position.

FIG. 17 is a cut-away view of a portion of the vanity mirror assembly taken within line 17-17 of FIG. 16.

DETAILED DESCRIPTION

Figure 1:
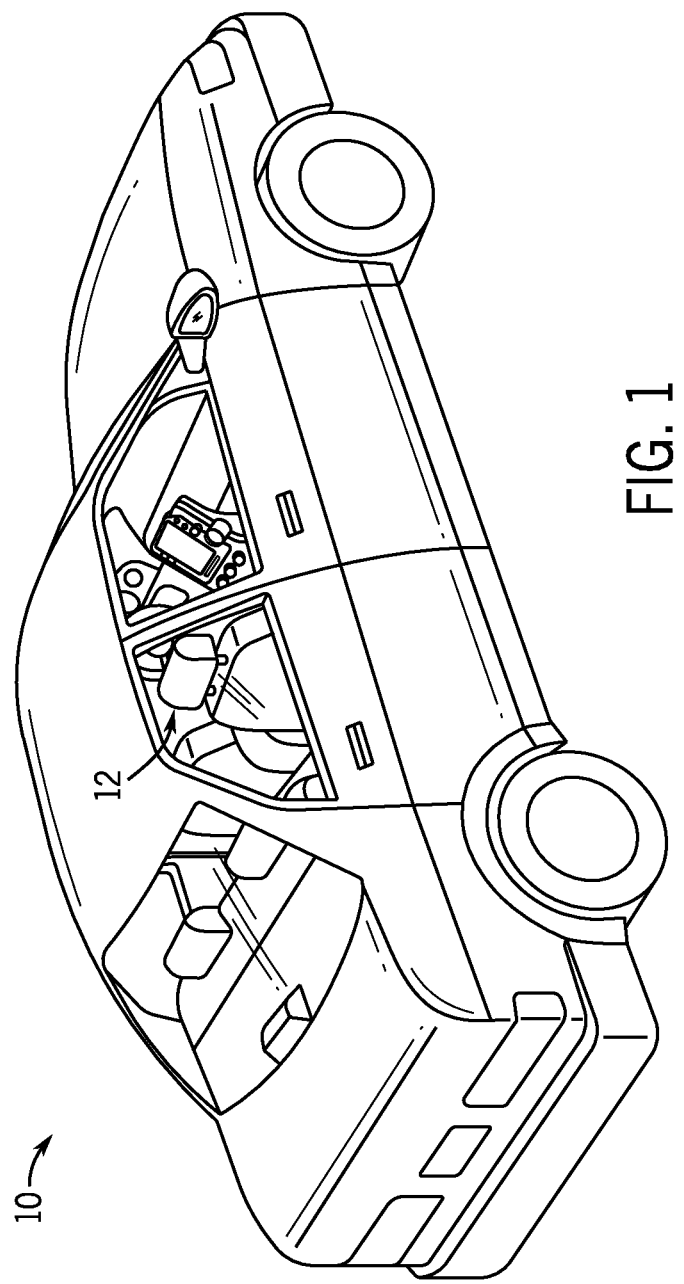
FIG. 1 is a perspective view of an embodiment of a vehicle that may include at least one sun visor having a vanity mirror assembly.

FIG. 1 is a perspective view of an embodiment of a vehicle 10. In certain embodiments, the vehicle 10 may include at least one sun visor within an interior 12 of the vehicle 10. In such embodiments, the sun visor is configured to shield vehicle an occupant from sunlight. The sun visor may include a vanity mirror assembly having a vanity mirror configured to enable a vehicle occupant to view a reflection in the vanity mirror. In certain embodiments, the vanity mirror assembly includes a reflective element (e.g., vanity mirror) and a cover configured to cover the reflective element while in a closed position and to at least partially expose the reflective element to the interior 12 of the vehicle 10 while in an open position. The cover may be configured to slide relative to a core of the sun visor, and the cover may include a substantially rigid panel disposed in front of the reflective element relative to the vehicle interior 12 while the cover is in the closed position and disposed on a side of the reflective element while the cover is in the open position.

In certain embodiments, the vanity mirror assembly includes a frame (e.g., support structure) that supports the cover as the cover moves (e.g., slides) between the closed position and the open position. In some embodiments, the vanity mirror assembly includes a biasing member (e.g., wire or spring) that drives at least a portion of the cover into engagement with the frame, thereby stabilizing the cover within the frame, for example. In some embodiments, the cover may include one or more stops (e.g., buffers or protrusions) that are configured to contact the frame when the cover is in the closed position and/or the open position. The vanity mirror assembly disclosed herein may provide a cover that is stable relative to the frame and that slides smoothly between the closed position and the open position. Furthermore, certain components of the vanity mirror assembly may experience low friction and/or low wear during operation and/or the vanity mirror assembly may be efficiently manufactured at low cost.

Figure 2:
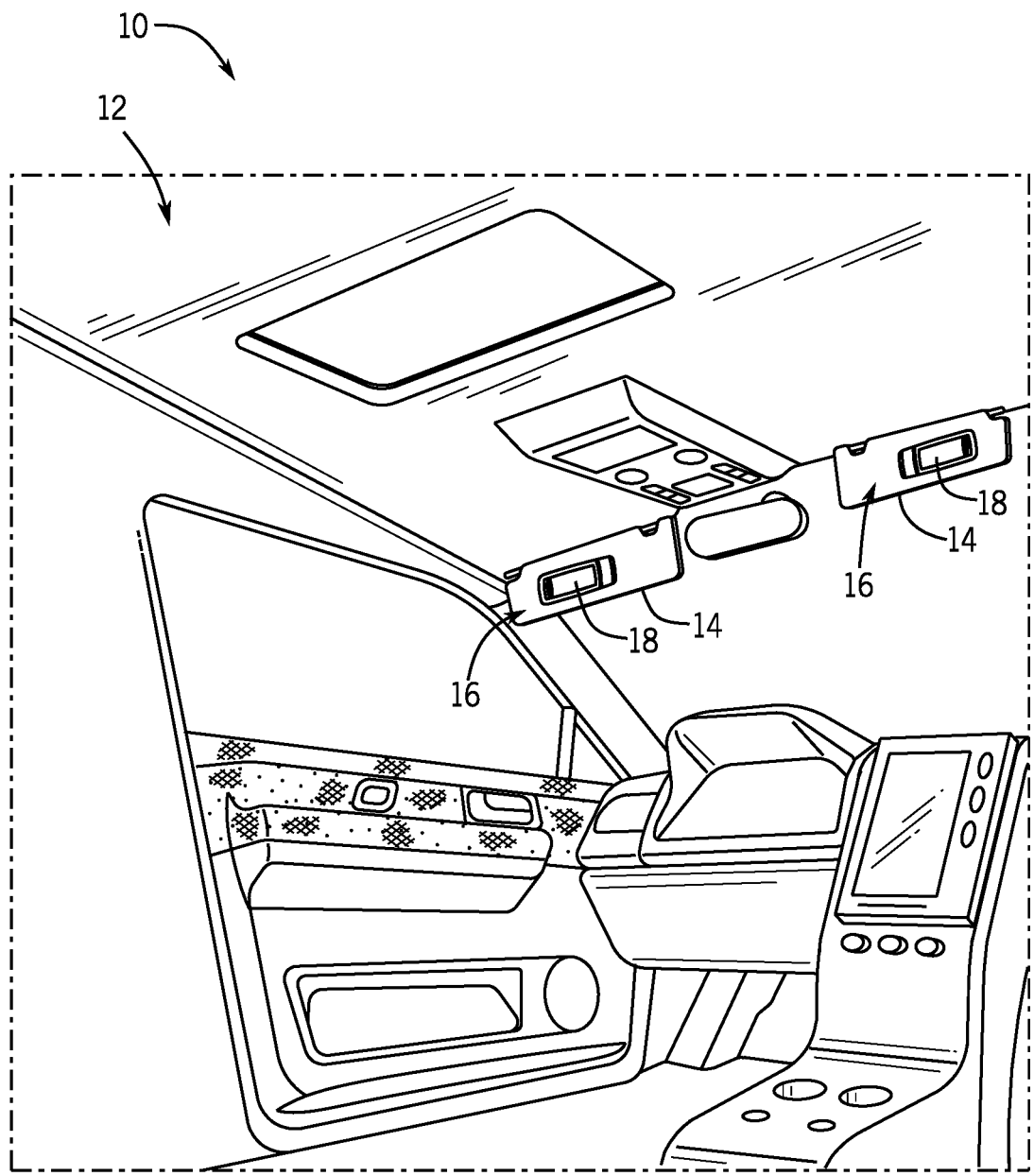
FIG. 2 is a perspective view of a part of an interior of the vehicle of FIG. 1.

FIG. 2 is a perspective view of a part of the interior 12 of the vehicle 10 of FIG. 1. As illustrated, the vehicle interior 12 includes a sun visor 14 having a vanity mirror assembly 16. As previously discussed, the vanity mirror assembly 16 may include a cover 18 (e.g., movable cover, vanity mirror door, cover assembly) that is configured to slide relative to a core of the sun visor 14.

Figure 3:
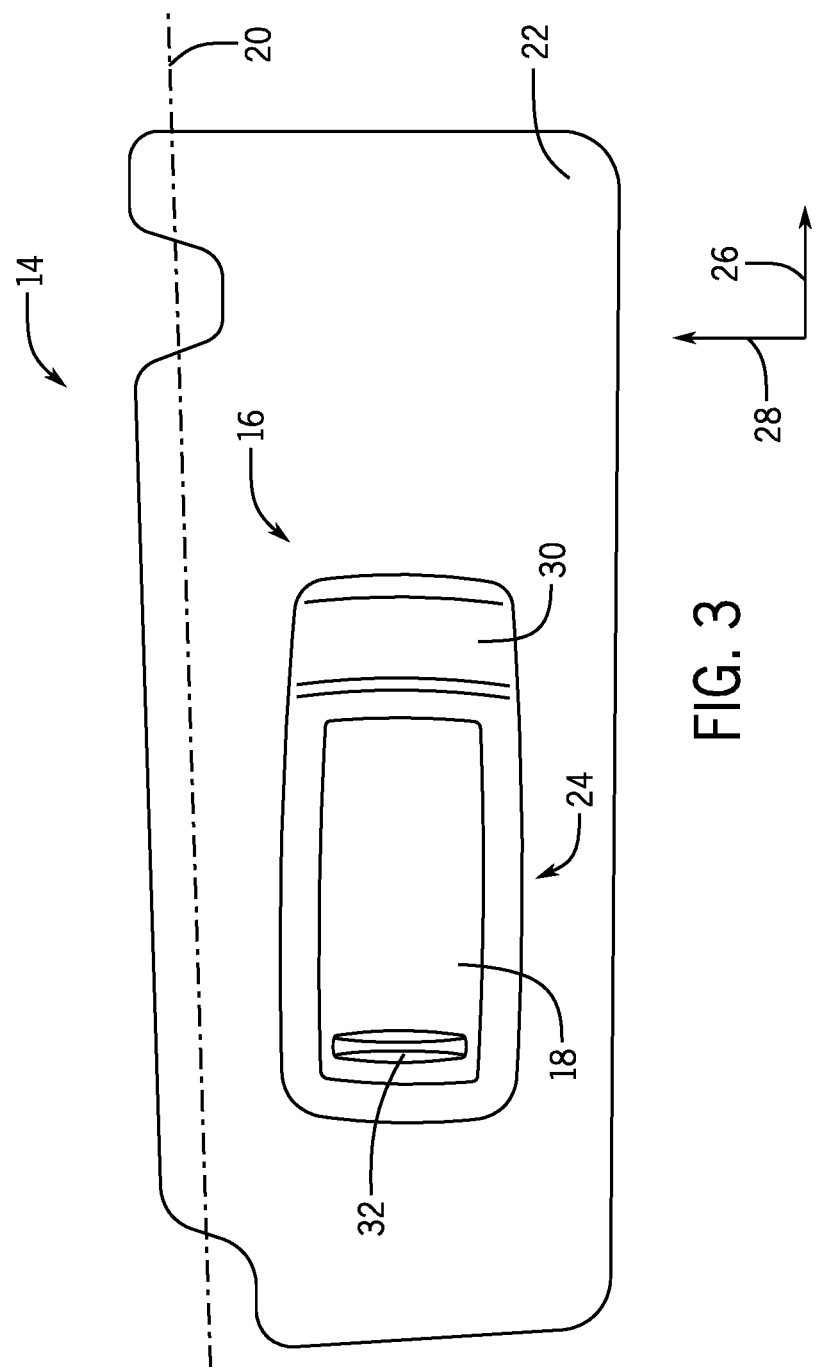
FIG. 3 is a front view of an embodiment of a sun visor having a vanity mirror assembly.

FIG. 3 is a front view of an embodiment of the sun visor 14 having the vanity mirror assembly 16. In certain embodiments, the sun visor 14 is configured to rotate about a rotational axis 20 between a stowage position (e.g., parallel to a headliner of the vehicle interior and/or in contact with the headliner) and a usage position (e.g., deployed to reduce light transmission into the vehicle interior). In the illustrated embodiment, the sun visor 14 includes a core 22 (e.g., body or outer layer), which may be formed from any suitable material, such as expanded polypropylene and/or compression formed materials, among others. In certain embodiments, the core 22 is formed from two (e.g., polymeric) shells coupled to one another.

In the illustrated embodiment, the vanity mirror assembly 16 includes the cover 18 configured to cover a reflective element (e.g., vanity mirror) of the vanity mirror assembly 16 while in the illustrated closed position 24 and to at least partially expose the reflective element to the vehicle interior while in an open position. In certain embodiments, the cover 18 includes a substantially rigid panel formed from any suitable substantially rigid material (e.g., metal, a polymeric material, a composite material, etc.). As illustrated, the cover 18 extends along a lateral axis 26 (e.g., parallel to the rotational axis 20) and along a vertical axis 28 (e.g., perpendicular to the rotational axis 20) relative to the core 22. In certain embodiments, the cover 18 is supported by a frame disposed within the core 22 and is configured to slide along the lateral axis 26 relative to the frame and the core 22 of the vehicle sun visor 14 to move between the closed position 24 and the open position. However, it should be understood that in certain embodiments, the vanity mirror assembly 16 may be adapted to enable the cover 18 to slide along the vertical axis 28 relative to the core 22 of the vehicle sun visor 14 to move between the closed position 24 and the open position. In the illustrated embodiment, the vanity mirror assembly 16 includes a bezel 30 that is configured to surround the reflective element and/or to overlay (e.g., cover or hide) a portion of the frame that supports the cover 18, and the cover 18 includes a handle 32 (e.g., groove, recess, protrusion, or the like) configured to enable a vehicle occupant to move the cover 18 between the closed position 24 and the open position. In should be appreciated that in some embodiments, the cover 18 may be driven to move between the closed position 24 and the open position by an electric motor, for example.

Figure 4:
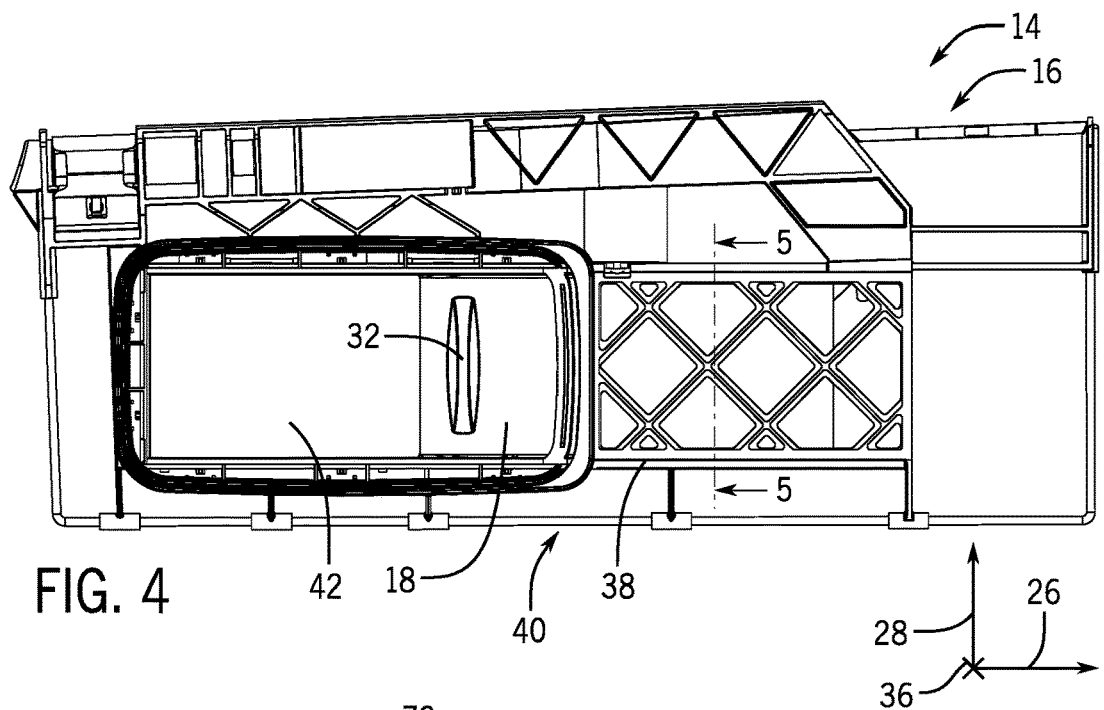
FIG. 4 is a front view of the vanity mirror assembly of FIG. 3, in which a cover of the vanity mirror assembly is in a partially open position.

FIG. 4 is a front view of the vanity mirror assembly 16 of the sun visor 14. In the illustrated embodiment, the cover 18 of the vanity mirror assembly 16 is in a partially open position 40 in which a portion of a reflective element 42 (e.g., formed from a sheet of metal, a reflective film, etc.) configured to enable a vehicle occupant to view a reflection is exposed. As shown, the vanity mirror assembly 16 includes a frame 38 (e.g., substantially rigid support structure formed from any suitable material, such as a metal, a polymeric material, a composite material, etc.) configured to support the cover 18 and the reflective element 42. As illustrated, the cover 18 is disposed forward of the reflective element 42 along a longitudinal axis 36. To transition the cover 18 from the closed position 24 shown in FIG. 3 to the partially open position 40 shown in FIG. 4, a vehicle occupant may grasp the handle 32 of the cover 18 and apply a force in a lateral direction along the lateral axis 26. As shown, a portion of the reflective element 42 is exposed when the cover 18 is in the partially open position 40.

Figure 5:
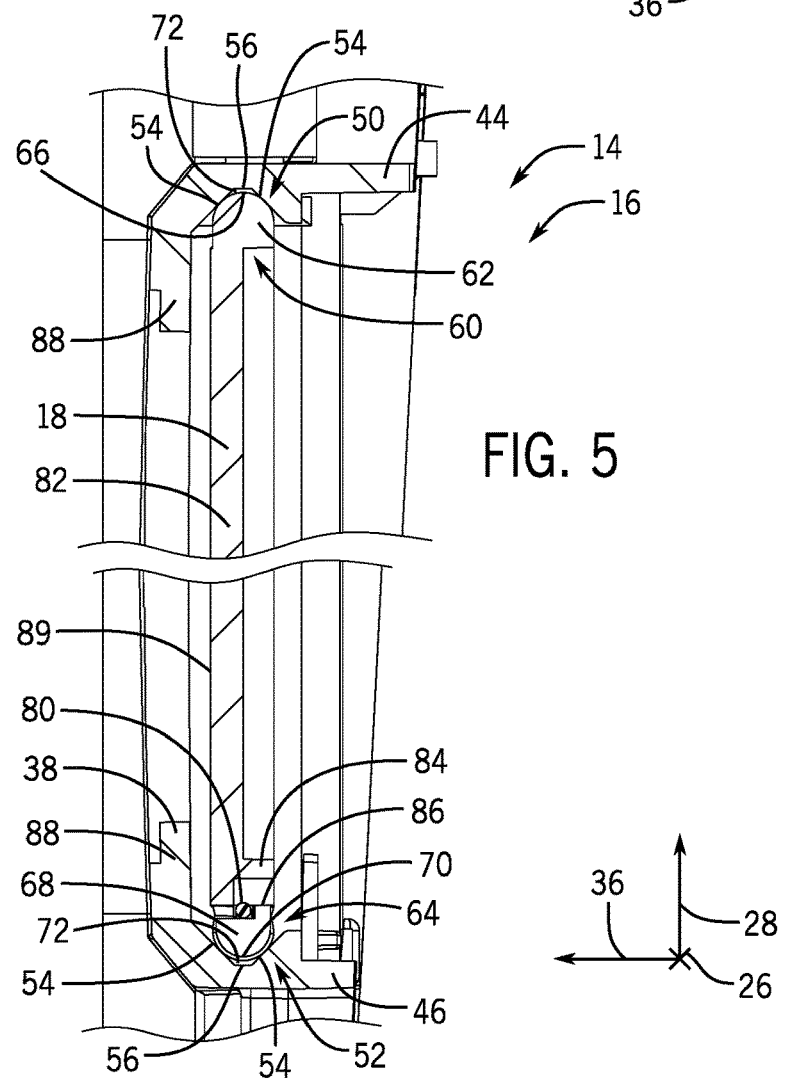
FIG. 5 is a cross-sectional side view of a portion of the vanity mirror assembly taken within line 5-5 of FIG. 4.

FIG. 5 is a cross-sectional side view of a portion of the vanity mirror assembly 16 taken within line 5-5 of FIG. 4. In the illustrated embodiment, the cover 18 is slideably supported within the frame 38 and is configured to move along the lateral axis 26 relative to the frame 38. As shown, the frame 38 includes a first laterally-extending wall 44 (e.g., upper wall or beam) and a second laterally-extending wall 46 (e.g., lower wall or beam). A first groove 50 (e.g., laterally-extending groove, recess, or track) is defined within the first laterally-extending wall 44 and a second groove 52 (e.g., laterally extending groove, recess, or track) is defined within the second laterally-extending wall 46, and the first groove 50 and the second groove 52 are configured to receive, retain, and/or support the cover 18 as the cover 18 slides relative to the frame 38 between the closed position and the open position. In the illustrated embodiment, the first groove 50 and the second groove 52 have a generally u-shaped cross-section and are defined by respective tapered surfaces 54 (e.g., tapered along the vertical axis 28, oriented at an angle relative to the vertical axis 28, converging toward or away from one another along the vertical axis 28) that are joined together by a vertically-facing surface 56 (e.g., generally perpendicular to the vertical axis 28 and/or extending along the lateral axis 26).

As shown, the cover 18 includes a first portion 60 (e.g., upper portion or edge) disposed within the first groove 50 and a second portion 64 (e.g., lower portion or edge) disposed within the second groove 52. In the illustrated embodiment, the first portion 60 includes a beam 62 (e.g., laterally-extending beam or edge member) having a curved cover contacting surface 66 (e.g., a frame-contacting surface) that is configured to contact the respective tapered surfaces 54 of the first groove 50, and the second portion 64 includes an arm 68 (e.g., a flexible arm or extension) that has a curved cover contacting surface 70 (e.g., a frame-contacting surface) that is configured to contact the respective tapered surfaces 54 of the second groove 52. The flexible arm 68 may be formed from any suitable flexible or substantially rigid material (e.g., a polymeric material or a composite material), and may be formed from a same or a different material as other components of the cover 18 (e.g., the same material as the beam 62). As shown, a gap 72 (e.g., space along the vertical axis 28) may be provided between the first portion 60 of the cover 18 and the first groove 50 of the frame 38 and/or between the second portion 64 of the cover 18 and the second groove 52 of the frame 38. Thus, the cover 18 may not contact one or both of the vertically-facing surfaces 56. Such a configuration may reduce a contact surface area (e.g., the only contact between the cover 18 and the grooves 50, 52 of the frame 38 is at portions of the curved cover contacting surfaces 66, 70 that contact the tapered surfaces 54) and/or friction between the cover 18 and the frame 38, thereby improving operation of the cover 18 and facilitating movement of the cover 18 relative to the frame 38, for example. In certain embodiments, the vertically-facing surface 56 may include a seam or a surface feature (e.g., due to the manufacturing process, such as due to joining separate portions of the frame 38 to one another during the manufacturing process, or the like), and thus, the presence of the gap 72 may block contact between the cover 18 and the seam or surface feature, thereby reducing friction and/or wear on components of the vanity mirror assembly 16. It should be understood that the contacting surfaces 66, 70 may have any of a variety of shapes that enable the cover 18 to fit within the grooves 50, 52 and/or that maintain the gap 72. For example, one or more of the contacting surfaces 66, 70 may include tapered surfaces (e.g., linear or non-curved surfaces) that contact the tapered surfaces 54, fit within the grooves 50, 52, and/or maintain the gap 72.

As discussed in more detail below, a biasing member 80 (e.g., spring, wire, or the like) is provided between the arm 68 and a body portion 82 (e.g., a central portion extending between the first portion 60 and the second portion 64 along the vertical axis 28) of the cover 18 along the vertical axis 28. In some embodiments, the biasing member 80 may be configured to drive the arm 68 and the body portion 82 away from one another along the vertical axis 28 and/or to drive the arm 68 into engagement with the second groove 52 of the frame 38, thereby stabilizing the cover 18 within the frame 38 (e.g., blocking movement of the cover 18 relative to the frame 38 along the vertical axis 28 and/or the longitudinal axis 36).

In certain embodiments, the cover 18 include features (e.g., beams, protrusions, guides) that facilitate retention of the biasing member 80 within the cover 18. For example, in the illustrated embodiment, a beam portion 84 (e.g., retention beam or guide) extends rearwardly along the longitudinal axis 36 from the body portion 82 of the cover 18, and a retention protrusion 86 (e.g., guide) extends from the arm 68 and toward the body portion 82 along the vertical axis 28. In certain embodiments, the configuration of the cover 18 and the frame 38 may enable operation of the cover 18 without the use of additional components (e.g., padding, buffers, liners, or the like) between the cover 18 and the frame 38. For example, the vanity mirror assembly 16 may not include an additional component between the curved contacting surfaces 66, 70 and the tapered surfaces 54 or between the cover 18 and a forward portion 88 of the frame 38. At least a portion of a front surface 89 (e.g., forward surface) of the body portion 82 of the cover 18 may be visible to an occupant of the vehicle 10 when the cover 18 is in the closed position 24.

FIG. 6 is a rear view of the cover 18 of the vanity mirror assembly 16 of FIG. 3. As shown, the cover 18 includes the first portion 60 having the beam 62 that extends along the lateral axis 26 between a first lateral side 90 and a second lateral side 92 of the cover 18. In the illustrated embodiment, the cover 18 also includes the second portion 64 having multiple biasing assemblies 95 having multiple arms 68 that extend from a beam 94 (e.g., laterally-extending beam or frame member) and that are configured to engage the second groove 52 of the frame 38. The cover 18 also includes the body portion 82, which may include a panel 96 (e.g., substantially flat portion) supported by a support structure 98 (e.g., having one more beams or reinforcing portions positioned rearward of the panel 96). As discussed in more detail below, the cover 18 may include one or more stops 102 positioned at the first lateral side 90 of the cover 18 that are configured to contact the frame 38 when the cover 18 is in the open position, and one or more stops 100 positioned at the second lateral side 92 of the cover 18 that are configured to contact the frame 38 when the cover 18 is in the closed position.

In the illustrated embodiment, the second portion 64 includes two biasing assemblies 95 each having two arms 68 and one biasing member 80. However, it should be understood that the cover 18 may include any suitable number (e.g., 1, 2, 3, 4, 5, or more) of biasing assemblies 95, and the biasing assemblies 95 may be positioned at any suitable location of the cover 18. For example, the cover 18 may additionally or alternatively include one or more biasing assemblies 95 along the first portion 62 of the cover 18, each biasing assembly 95 includes a respective biasing member 80 and respective arms 68 that are configured to engage the first groove 50 of the frame 38.

FIG. 7 is a cross-sectional rear view of the second portion 64 of the cover 18 of the vanity mirror assembly 16 taken within line 7-7 of FIG. 6. As shown, the second portion 64 of the cover 18 includes the multiple arms 68, which extend from the beam 94. The multiple arms 68 may be driven along the vertical axis 28 by the biasing member 80, as shown by arrow 110. Thus, the multiple arms 68 may be driven away from the body portion 82 of the cover 18 and into engagement with the frame 38 (e.g., the second groove 52 of the frame 38). In the illustrated embodiment, a first end portion 112 of the biasing member 80 and a second end portion 114 of the biasing member 80 are supported by corresponding support surfaces 116 of the beam 94 and/or the arms 68. A central portion 96 of the biasing member 80 contacts corresponding contacting surfaces 99 of the multiple arms 68 and exerts a force on the multiple arms 68.

Figure 8:
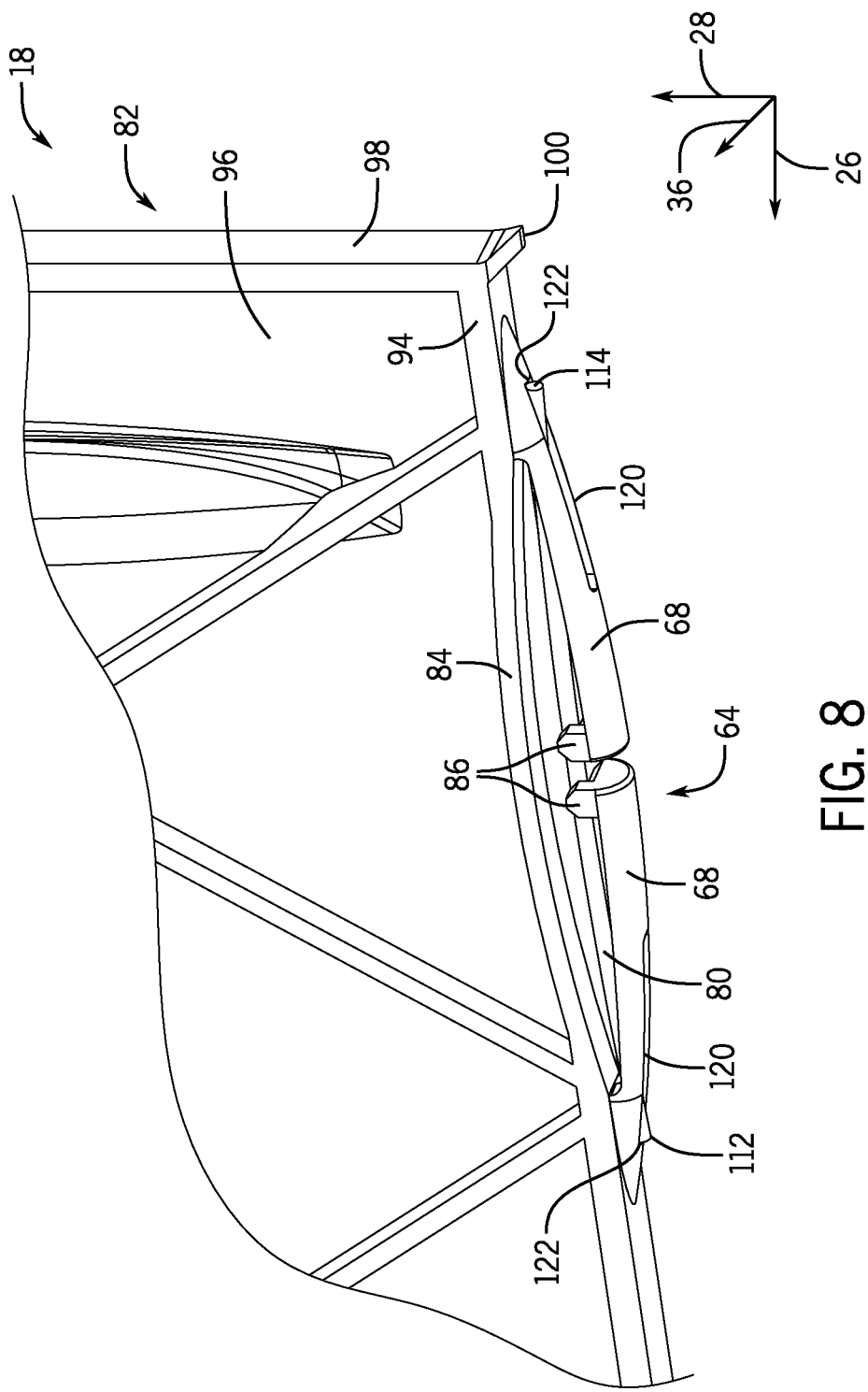
FIG. 8 is a perspective rear view of a portion of the cover of the vanity mirror assembly taken within line 8-8 of FIG. 6.

FIG. 8 is a perspective rear view of the second portion 64 of the cover 18 of the vanity mirror assembly 16 taken within line 8-8 of FIG. 6. As shown, the multiple arms 68 extend from the beam 94, and the biasing member 80 is positioned between the multiple arms 68 and the beam portion 84 along the vertical axis 28. In the illustrated embodiment, the biasing member 80 extends through slots 120 (e.g., openings) formed in the multiple arms 68, and the first and second ends 112, 114 contact and/or are supported (e.g., buttressed) by respective lip portions 122 of the arms 68. In certain embodiments, the lip portions 122 may block movement of the biasing member 80 along the lateral axis 26, thereby retaining the biasing member 80 within the cover 18. As shown, the retention protrusions 86 extending from the arms 68 may support the biasing member 80 and/or block movement of the biasing member 80 along the longitudinal axis 36.

In the illustrated embodiments, the biasing member 80 is a wire (e.g., straight, linear, non-coiled, non-helical, and/or flexible wire or rod, formed from any suitable metallic or polymer material). In certain embodiments, the biasing member 80 may be inserted into the illustrated position within the cover 18. For example, the one end (e.g., the first end 112) of the biasing member 80 may be inserted through one slot 120 and guided through the space between the multiple arms 68 and the beam portion 84 until contacting the respective lip portion 122 adjacent to the other slot 120, and then the biasing member 80 may be bent or curved in order to position the other end (e.g., the second end 114) of the biasing member 80 within the one slot 120 to reach the illustrated position. In some embodiments, the biasing member 80 may be a straight wire prior to placement within the cover 18, and the biasing member 80 may have a curved or bent shape when positioned within the cover 18. In the illustrated embodiment, the biasing member 80 is supported within the cover 18, moves with the cover 18 and relative to the frame 38, and is configured to avoid contact with the frame 38. Such a configuration may reduce wear on the frame 38 during operation and/or as the cover 18 slides relative to the frame 38 between the closed position and the open position (e.g., due to lack of direct contact between the frame 38 and the biasing member 80, which may be formed from a relatively harder material and/or generate relatively high localized force).

Figure 9:
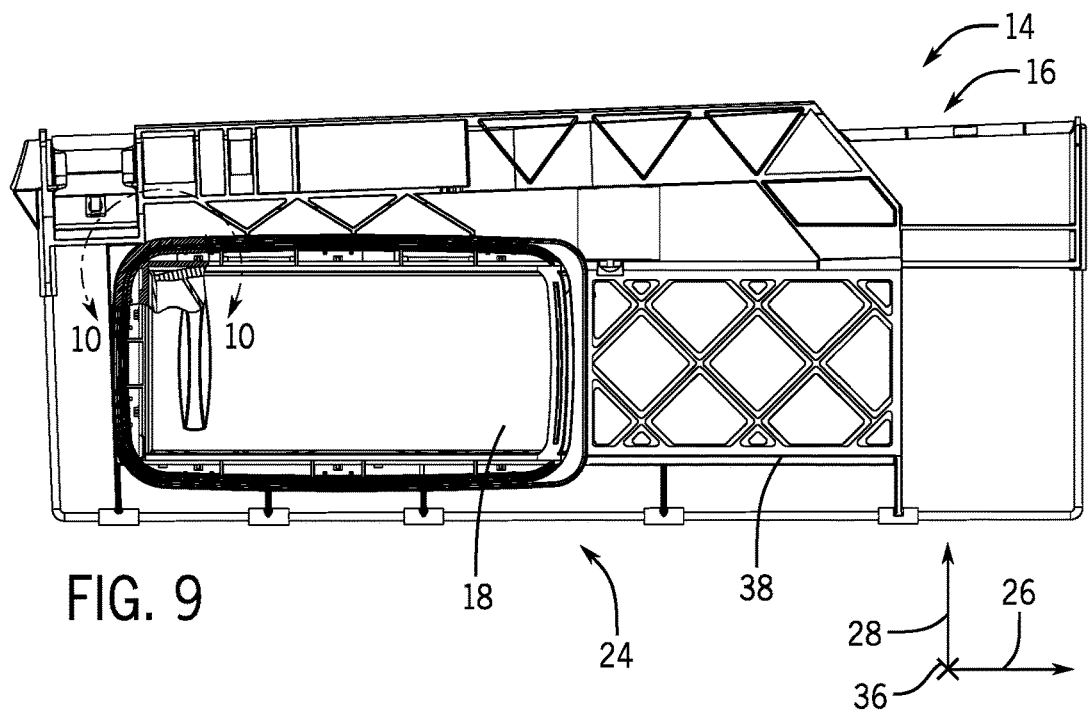
FIG. 9 is a front view of the vanity mirror assembly of FIG. 3, in which a cover of the vanity mirror assembly is in a closed position.
Figure 10:
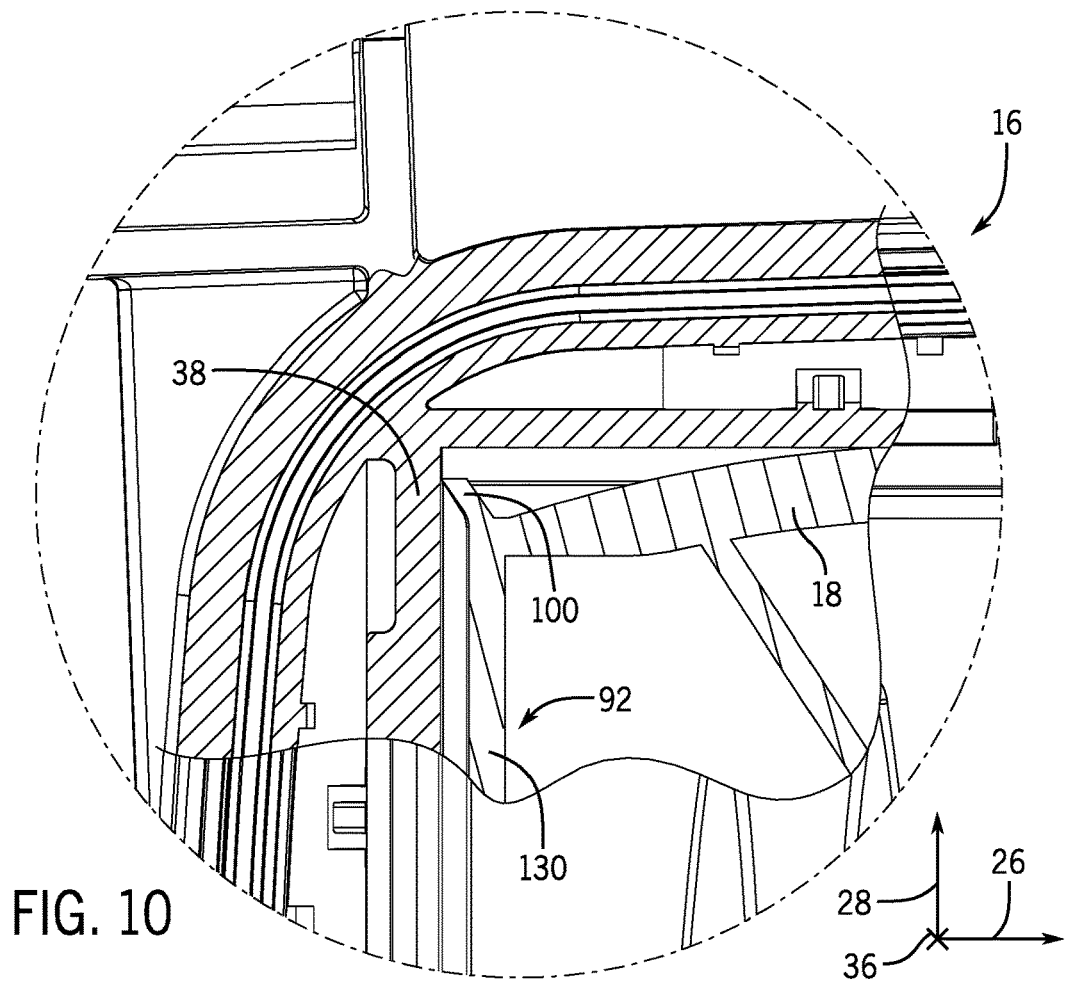
FIG. 10 is a cut-away view of a portion of the vanity mirror assembly taken within line 10-10 of FIG. 9.

FIG. 9 is a front view of the vanity mirror assembly 16 with the cover 18 in the closed position 24, and FIG. 10 is a cut-away view of a portion of the vanity mirror assembly 16 taken within line 10-10 of FIG. 9. As shown, in the closed position 24, the stop 100 at the second lateral side 92 of the cover 18 may contact the frame 38 and/or may block contact between a beam 130 (e.g., vertical beam) of the cover 18 and the frame 38. In certain embodiments, the stop 100 may be configured to flex or bend upon contact with the frame 38, thereby protecting the cover 18 and/or the frame 38 as the cover 18 is moved to the closed position 24. As noted above and illustrated in FIG. 6, the cover 18 may include one or more stops 102 positioned at the first lateral side 90 of the cover 18, and the one or more stops 102 may be configured to flex or bend upon contact with the frame 38 when the cover 18 is in the open position.

Figure 11:
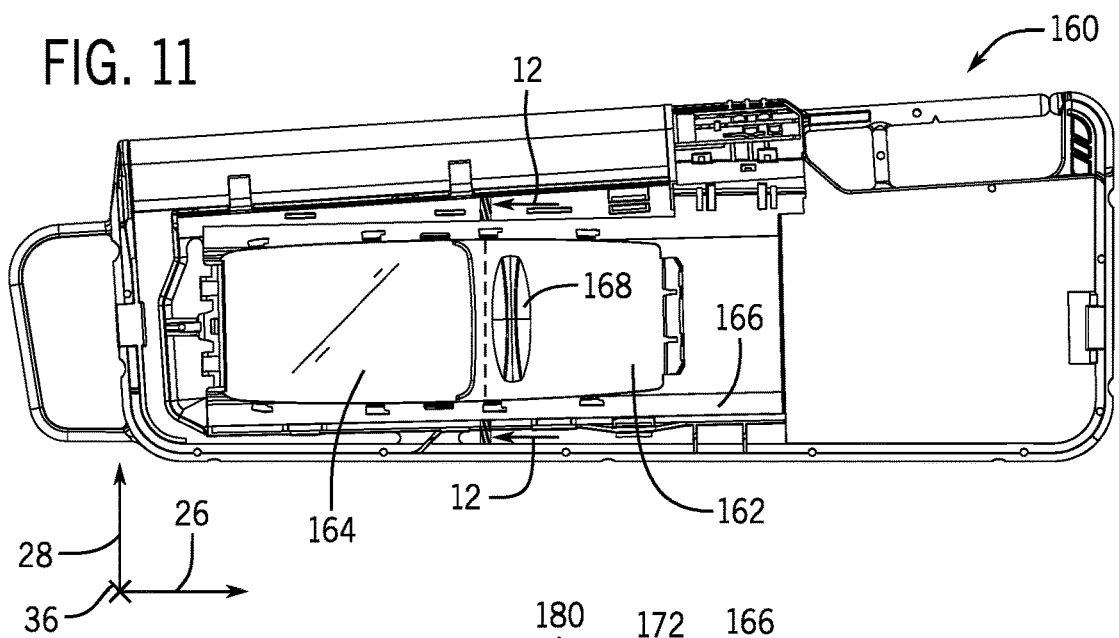
FIG. 11 is a front view of an embodiment of a vanity mirror assembly that may be used in a sun visor of the vehicle of FIG. 1, wherein a cover of the vanity mirror assembly is in a partially open position.

FIG. 11 is a front view of an embodiment of a vanity mirror assembly 160 that may be used in a sun visor 14 of the vehicle 10 of FIG. 1. In the illustrated embodiment, the vanity mirror assembly 16 includes a cover 162 configured to cover a reflective element 164 (e.g., vanity mirror formed from a sheet of metal, a reflective film, etc.) of the vanity mirror assembly 160 while in a closed position and to at least partially expose the reflective element 164 to the vehicle interior while in an open position. In certain embodiments, the cover 162 includes a substantially rigid panel formed from any suitable substantially rigid material (e.g., metal, a polymeric material, a composite material, etc.). As illustrated, the cover 162 extends along the lateral axis 26 and along the vertical axis 28 relative to a frame 166 (e.g., substantially rigid support structure formed from any suitable material, such as a metal, a polymeric material, a composite material, etc.) of the vanity mirror assembly 160.

In certain embodiments, the cover 162 is supported by the frame 166 and is configured to slide along the lateral axis 26 relative to the frame 166 to move between the closed position and the open position. However, it should be understood that in certain embodiments, the vanity mirror assembly 160 may be adapted to enable the cover 162 to slide along the vertical axis 28 relative to the frame 166 to move between the closed position and the open position. In the illustrated embodiment, the cover 18 includes a handle 168 (e.g., groove, recess, protrusion, or the like) configured to enable a vehicle occupant to move the cover 162 between the closed position and the open position. It should be appreciated that in some embodiments, the cover 162 may be driven to move between the closed position and the open position by an electric motor, for example.

Figure 12:
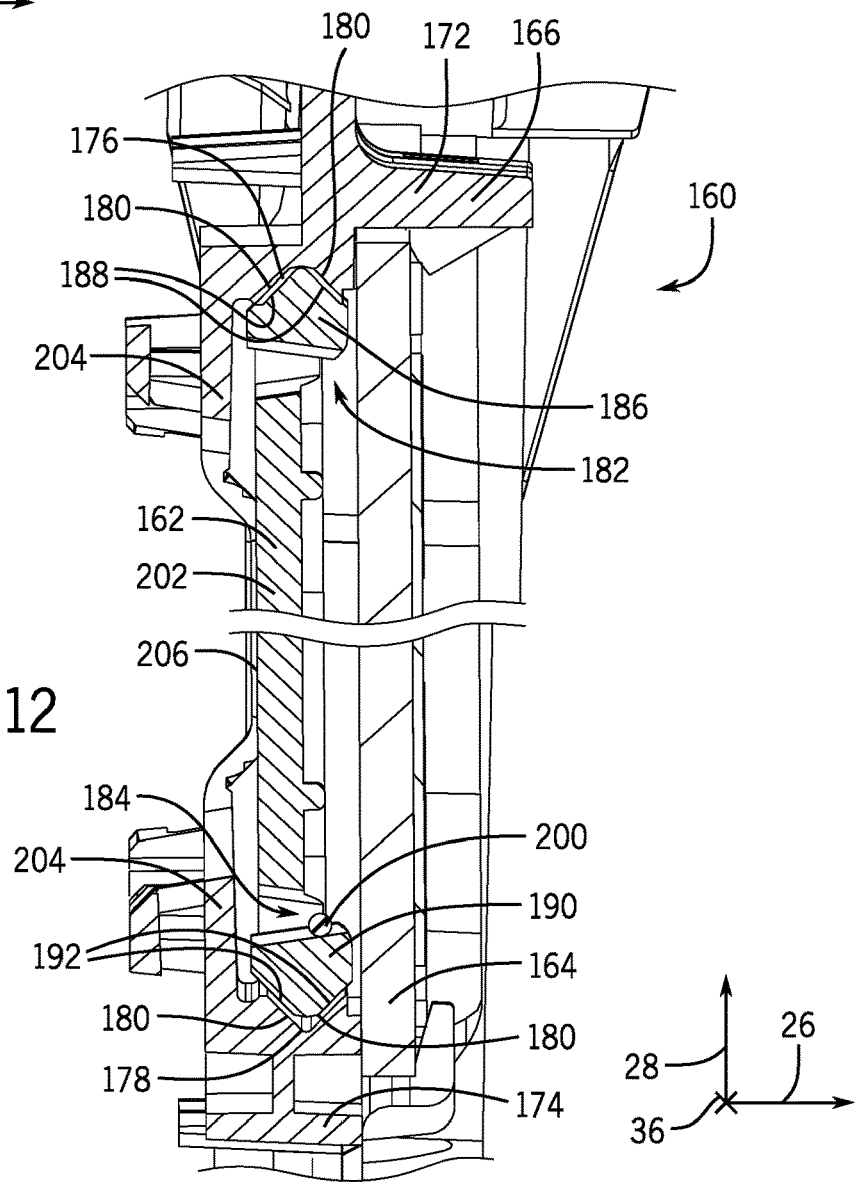
FIG. 12 is a cross-sectional side view of a portion of the vanity mirror assembly taken within line 12-12 of FIG. 11.

FIG. 12 is a cross-sectional side view of a portion of the vanity mirror assembly 160 taken within line 12-12 of FIG. 11. In the illustrated embodiment, the cover 162 is slideably supported within the frame 166 and is configured to move along the lateral axis 26 relative to the frame 166. As shown, the frame 166 includes a first laterally-extending wall 172 (e.g., upper wall or beam) and a second laterally-extending wall 174 (e.g., lower wall or beam). A first groove 176 (e.g., laterally-extending groove, recess, or track) is defined within the first laterally-extending wall 172 and a second groove 178 (e.g., laterally extending groove, recess, or track) is defined within the second laterally-extending wall 174, and the first groove 176 and the second groove 178 are configured to receive, retain, and/or support the cover 162 as the cover 162 slides relative to the frame 166 between the closed position and the open position. In the illustrated embodiment, the first groove 176 and the second groove 178 have a generally v-shaped cross-section and are defined by respective tapered surfaces 180 (e.g., tapered along the vertical axis 28, oriented at an angle relative to the vertical axis 28, converging toward or away from one another along the vertical axis 28) that are joined to one another.

As shown, the cover 162 includes a first portion 182 (e.g., upper portion or edge) disposed within the first groove 176 and a second portion 184 (e.g., lower portion or edge) disposed within the second groove 178. In the illustrated embodiment, the first portion 182 includes a beam 186 (e.g., laterally-extending beam or edge member) having tapered frame-contacting surfaces 188 that are configured to contact the respective tapered surfaces 180 of the first groove 176, and the second portion 184 includes a beam 190 (e.g., laterally-extending beam, edge member, or flexible arm) that has tapered frame-contacting surfaces 192 that are configured to contact the respective tapered surfaces 180 of the second groove 178. It should be understood that the contacting surfaces 188, 192 may have any of a variety of shapes that enable the cover 162 to fit within the grooves 176, 178. For example, one or more of the contacting surfaces 188, 192 may include a curved surface that contacts the tapered surfaces 180.

As discussed in more detail below, a biasing member 200 (e.g., spring, wire, or the like) is provided between the beam 190 and a body portion 202 (e.g., a central portion extending between the first portion 182 and the second portion 184 along the vertical axis 28) of the cover 162 along the vertical axis 28. In some embodiments, the biasing member 200 may be configured to drive the beam 190 and the body portion 202 away from one another along the vertical axis 28 and/or to drive the beam 190 into engagement with the second groove 178 of the frame 166, thereby stabilizing the cover 162 within the frame 166 (e.g., blocking movement of the cover 162 relative to the frame 166 along the vertical axis 28 and/or the longitudinal axis 36). In certain embodiments, the configuration of the cover 162 and the frame 166 may enable operation of the cover 162 without the use of additional components (e.g., padding, buffers, liners, or the like) between the cover 162 and the frame 166. For example, the vanity mirror assembly 160 may not include an additional component between the frame-contacting surfaces 180, 192 and the tapered surfaces 180 or between the cover 162 and a forward portion 204 of the frame 166. At least a portion of a front surface 206 (e.g., forward surface) of the body portion 202 of the cover 162 may be visible to an occupant of the vehicle 10 when the cover 162 is in the closed position.

FIG. 13 is a rear view of the cover of the vanity mirror assembly 160. As shown, the cover 162 includes the first portion 182 having the beam 186 that extends along the lateral axis 26 between a first lateral side 210 and a second lateral side 212 of the cover 162, and the cover 162 also includes the second portion 184 having the beam 190 that extends along the lateral axis 26 between the first lateral side 210 and the second lateral side 212 of the cover 162. In the illustrated embodiment, the cover 162 includes the body portion 202, which may include a panel 220 (e.g., substantially flat portion) supported by a support structure 222 (e.g., having one more beams or reinforcing portions positioned rearward of the panel 220). As discussed in more detail below, the cover 162 may include one or more stops 224 positioned at the first lateral side 210 of the cover 162 that are configured to contact the frame 166 when the cover 162 is in the open position, and one or more stops 226 positioned at the second lateral side 212 of the cover 162 that are configured to contact the frame 166 when the cover 162 is in the closed position.

The illustrated cover 18 includes a biasing assembly 228 having the biasing member 200, which extends from a first end portion 230 to a second end portion 232. The biasing member 200 contacts and is supported by multiple features (e.g., beams, protrusions, guides). For example, in the illustrated embodiment, the ends 230, 232 of the biasing member 200 are supported against the beam 290 (e.g., within recesses 234 defined within the beam 290) and the biasing member 334 bends around multiple protrusions 236 that extend rearwardly (e.g., along the longitudinal axis 36) from the panel 220 of the cover 162.

While the illustrated embodiment includes one biasing assembly 228 having one biasing member 200, it should be understood that the cover 162 may include any suitable number (e.g., 1, 2, 3, 4, 5, or more) of biasing assemblies 228, and the biasing assemblies 228 may be positioned at any suitable location of the cover 162. For example, the cover 162 may additionally or alternatively include one or more biasing assemblies 228 along the first portion 182 of the cover 162 that are configured to engage the first groove 176 of the frame 166.

FIG. 14 is a rear view of the second portion 184 of the cover 162 of the vanity mirror assembly 160 taken within line 14-14 of FIG. 13. As shown, the second portion 184 of the cover 162 includes the beam 190 and the biasing assembly 228. At least some portions of the beam 190 may be driven along the vertical axis 28 by the biasing member 200, as shown by arrows 240. Thus, the beam 190 may be driven away from the body portion 202 of the cover 162 and into engagement with the frame 166 (e.g., the second groove 178 of the frame 166). In the illustrated embodiment, the first end portion 230 of the biasing member 200 and the second end portion 232 of the biasing member 200 are supported by corresponding recesses 234 defined within the beam 190. A central portion 242 of the biasing member 200 contacts and bends around a central protrusion 244 of the multiple protrusions 236, and the biasing member 200 contacts and bends around additional protrusions 246 of the multiple protrusions 236.

FIG. 15 is a perspective rear view of a portion of the cover 162 of the vanity mirror assembly 160 taken within line 15-15 of FIG. 14. As shown, the first end 230 of the biasing member 200 is positioned within the recess 234 formed in the beam 190. In the illustrated embodiment, a lip portion 248 is provided to retain the biasing member 200 within the cover 162 and to block movement of the biasing member 200 relative to the body portion 202 of the cover 162 along the lateral axis 26. As shown, the protrusion 236 extending from the body portion 202 of the cover 18 may contact and support the biasing member 200 in a position that enables the biasing member 200 to drive the beam 190 into engagement with the frame 166.

In certain embodiments, the biasing member 200 is a wire (e.g., straight, non-coiled, non-helical, and/or flexible wire or rod, formed from any suitable metallic or polymer material). In certain embodiments, the biasing member 200 may be inserted into the illustrated position within the cover 162. For example, one end (e.g., the first end portion 130) of the biasing member 200 may be inserted into one of the recesses 234 of the beam 290, the biasing member 200 may be guided into position about the multiple protrusions 236, and the other end (e.g., the second end portion 132) may be pressed or inserted into place within the other one of the recesses 234 of the beam 290. In the illustrated embodiment, the biasing member 200 is supported within the cover 162, moves with the cover 162 and relative to the frame 166, and does not contact the frame 166. Such a configuration may reduce wear on the frame 166 during operation and/or as the cover 162 slides relative to the frame 166 between the closed position and the open position (e.g., due to lack of direct contact between the frame 166 and the biasing member 200, which may be formed from a relatively harder component and/or generate relatively high localized force).

FIG. 16 is a front view of the vanity mirror assembly 160 with the cover 162 in an open position 250, and FIG. 17 is a cut-away view of a portion of the vanity mirror assembly 160 taken within line 17-17 of FIG. 16. As shown, in the open position 250, the stop 224 at the first lateral side 210 of the cover 162 may contact the frame 166 and/or may block contact between the beam 190 and the frame 166 and/or between the panel 220 of the body portion 202 and the frame 166, for example. In certain embodiments, the stop 224 may be configured to flex or bend upon contact with the frame 166, thereby protecting the cover 162 and/or the frame 166 as the cover 162 is moved to the open position 250. As noted above and illustrated in FIG. 13, the cover 162 may include one or more stops 226 positioned at the second lateral side 212 of the cover 162, and the one or more stops 226 may be configured to flex or bend upon contact with the frame 166 when the cover 162 is in the closed position.

It should be understood that any of the examples provided herein are not intended to be limiting and any and all of the features shown and described with respect to FIGS. 1-17 may be used in any combination with one another. For example, the cover 18 shown in FIGS. 2-10 may be utilized with the frame 166 having tapered surface 180 that are joined to one another, as shown in FIGS. 11-17. As another example, one or both of the first portion 62 or the multiple arms 68 of the cover 18 shown in FIGS. 5-18 may have linear contacting surfaces or tapered contacting surfaces, similar to the tapered contacting surfaces 188, 192 shown in FIG. 12. It should also be understood that the cover 18, 162 may be utilized to cover additional and/or other elements (e.g., lights) within vanity mirror assemblies.

When introducing elements, the articles "a," "an," and "the" are intended to mean that there are one or more of the elements. The terms "comprising," "including," and "having" are used in an open-ended fashion, and thus should be interpreted to mean "including, but not limited to . . . ." While only certain features and embodiments of the disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the embodiments, or those unrelated to enabling the claimed embodiments). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vanity mirror assembly for a vehicle sun visor, comprising:
a frame comprising a first groove; and
a cover configured to slide relative to the frame between a closed position in which the cover is disposed in front of a reflective element and an open position in which the cover at least partially exposes the reflective element to a vehicle interior;
wherein the first groove is configured to receive a first edge portion of the cover, the first groove comprises tapered surfaces that converge toward one another, and the first edge portion comprises a curved contacting surface that is configured to contact the tapered surfaces as the cover slides within the frame between the closed position and the open position.

2. The vanity mirror assembly of claim 1, wherein the tapered surfaces are joined together by a vertically-facing surface.

3. The vanity mirror assembly of claim 2, wherein the cover does not contact the vertically-facing surface of the first groove as the cover slides within the frame between the closed position and the open position.

4. The vanity mirror assembly of claim 1, wherein the frame comprises a second groove configured to receive a second edge portion of the cover, the second groove comprises respective tapered surfaces that converge toward one another, and the second edge portion comprises a respective curved contacting surface that is configured to contact the respective tapered surfaces of the second groove.

5. The vanity mirror assembly of claim 1, wherein the first edge portion comprises a biasing assembly comprising a flexible arm and a biasing member configured to drive the flexible arm away from a substantially rigid body portion of the cover and into the first groove of the frame.

6. The vanity mirror assembly of claim 5, wherein the biasing member comprises a wire.

7. The vanity mirror assembly of claim 5, wherein the biasing member is configured to move with the cover and does not contact the frame as the cover slides within the frame between the closed position and the open position.

8. A vanity mirror assembly for a vehicle sun visor, comprising:
a frame comprising a groove; and
a cover configured to slide relative to the frame between a closed position in which the cover is disposed in front of a reflective element and an open position in which the cover at least partially exposes the reflective element to a vehicle interior, wherein the cover comprises a substantially rigid body portion and one or more flexible arms extending from the substantially rigid body portion;
wherein the groove is configured to receive the one or more flexible arms, the groove comprises tapered surfaces that converge toward one another, and each flexible arm of the one or more flexible arms comprises a curved contacting surface that is configured to contact the tapered surfaces as the cover slides within the frame between the closed position and the open position.

9. The vanity mirror assembly of claim 8, wherein the tapered surfaces are joined together by a vertically-facing surface.

10. The vanity mirror assembly of claim 9, wherein the one or more flexible arms do not contact the vertically-facing surface of the groove as the cover slides within the frame between the closed position and the open position.

11. The vanity mirror assembly of claim 8, comprising a biasing member configured to drive the one or more flexible arms away from the substantially rigid body portion and into the groove, wherein the biasing member comprises a first end portion positioned within a first slot formed in a first flexible arm of the one or more flexible arms and a second end portion positioned within a second slot formed in a second flexible arm of the one or more flexible arms.

12. The vanity mirror assembly of claim 11, wherein the biasing member comprises a wire.

13. The vanity mirror assembly of claim 11, wherein the biasing member is configured to move with the cover as the cover slides between the closed position and the open position.

14. The vanity mirror assembly of claim 13, wherein the biasing member does not contact the frame as the cover slides between the closed position and the open position.

15. The vanity mirror assembly of claim 11, wherein a central portion of the biasing member is configured to contact respective contacting surfaces of the first flexible arm and the second flexible arm to drive the first flexible arm and the second flexible arm away from the substantially rigid body portion and into the groove of the frame.

16. A vanity mirror assembly for a vehicle sun visor, comprising:
a frame comprising a first groove and a second groove; and
a cover configured to slide relative to the frame between a closed position in which the cover is disposed in front of a reflective element and an open position in which the cover at least partially exposes the reflective element to a vehicle interior;
wherein the first groove is configured to receive a first edge portion of the cover, the first groove comprises tapered surfaces that converge toward one another and are joined together by a vertically-facing surface of the first groove, the first edge portion comprises a curved contacting surface that is configured to contact the tapered surfaces of the first groove as the cover slides within the frame between the closed position and the open position, the second groove is configured to receive a second edge portion of the cover, the second groove comprises tapered surfaces that converge toward one another and are joined together by a vertically-facing surface of the second groove, and the second edge portion comprises a curved contacting surface that is configured to contact the tapered surfaces of the second groove as the cover slides within the frame between the closed position and the open position.

17. The vanity mirror assembly of claim 16, wherein the cover does not contact the vertically-facing surface of the first groove as the cover slides within the frame between the closed position and the open position.

18. The vanity mirror assembly of claim 16, wherein the cover does not contact the vertically-facing surface of the second groove as the cover slides within the frame between the closed position and the open position.

19. The vanity mirror assembly of claim 16, wherein the first edge portion comprises a biasing assembly comprising a flexible arm and a biasing member configured to drive the flexible arm away from a substantially rigid body portion of the cover and into the first groove of the frame.

20. The vanity mirror assembly of claim 19, wherein the biasing member comprises a wire.

\* \* \* \* \*